(12) United States Patent
Moretto

(10) Patent No.: US 12,151,951 B2
(45) Date of Patent: Nov. 26, 2024

(54) FILTERING CONTAINER FOR LIQUIDS

(71) Applicant: LAICA S.P.A., Barbarano Mossano (IT)

(72) Inventor: Maurizio Moretto, Vicenza (IT)

(73) Assignee: LAICA S.P.A., Barbarano Mossano (IT)

( * ) Notice: Subject to any disclaimer, the term of this patent is extended or adjusted under 35 U.S.C. 154(b) by 489 days.

(21) Appl. No.: 17/422,006

(22) PCT Filed: Jan. 10, 2020

(86) PCT No.: PCT/IB2020/050186
§ 371 (c)(1),
(2) Date: Jul. 9, 2021

(87) PCT Pub. No.: WO2020/144642
PCT Pub. Date: Jul. 16, 2020

(65) Prior Publication Data
US 2022/0098055 A1    Mar. 31, 2022

(30) Foreign Application Priority Data

Jan. 11, 2019   (IT) .......................... 102019000000487
Jul. 2, 2019    (IT) .......................... 102019000010746

(51) Int. Cl.
*C02F 1/00* (2023.01)
*B65D 25/42* (2006.01)
*B65D 47/32* (2006.01)

(52) U.S. Cl.
CPC .............. *C02F 1/003* (2013.01); *B65D 25/42* (2013.01); *B65D 47/32* (2013.01); *C02F 2307/02* (2013.01); *C02F 2307/04* (2013.01)

(58) Field of Classification Search
CPC .. C02F 1/003; C02F 2307/02; C02F 2307/04; C02F 1/283; C02F 2201/004;
(Continued)

(56) References Cited

U.S. PATENT DOCUMENTS 6,565,743 B1    5/2003  Poirier et al.
2008/0203007 A1  8/2008  Jang et al.
(Continued)

FOREIGN PATENT DOCUMENTS

WO    200230766    4/2002
WO    2006031838   3/2006
(Continued)

OTHER PUBLICATIONS

International Search Report dated Mar. 5, 2020 received in International Application No. PCT/IB2020/050186.

*Primary Examiner* — Waqaas Ali
(74) *Attorney, Agent, or Firm* — Stradley Ronon Stevens & Young, LLP

(57) ABSTRACT

A filtering container for liquids, in particular water. The filtering container includes a main body, a gripping portion which is configured to be gripped by a user for lifting the container and pouring out the liquid contained therein, a closure for an opening which is defined in the main body which includes a filtering element which is arranged in a position to intercept the liquid being discharged from the main body, a dispenser for the liquid which is configured in such a way that the liquid is dispensed through a dispensing zone for the liquid which is defined adjacent to a side wall of the main body and a ventilation pipe which opens inside the main body in a ventilation zone and extends in the form of an elongate element towards the interior of the main body.

19 Claims, 17 Drawing Sheets

(58) Field of Classification Search
CPC ............ C02F 2201/006; C02F 2303/04; C02F 1/002; B65D 25/42; B65D 47/32
See application file for complete search history.

(56) References Cited

U.S. PATENT DOCUMENTS

2016/0031721 A1* 2/2016 Kellam .................... C02F 1/42
                                                          210/244
2018/0044201 A1   2/2018 Metaxatos et al.

FOREIGN PATENT DOCUMENTS

| WO | 2010142473 | 12/2010 | | |
|---|---|---|---|---|
| WO | 2017053588 | 3/2017 | | |
| WO | WO-2017053588 A1 * | 3/2017 | ............... | A45F 3/16 |

* cited by examiner

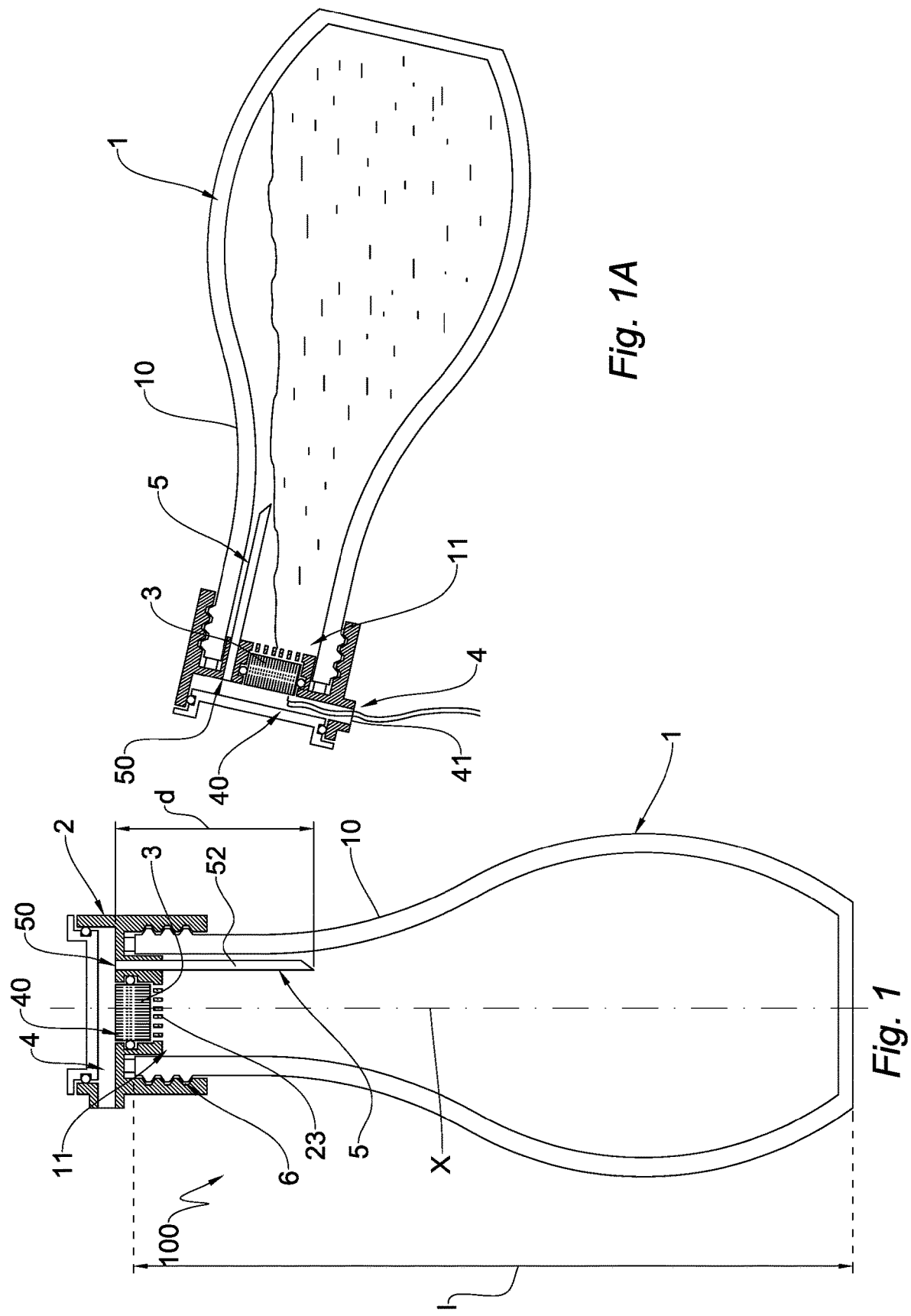

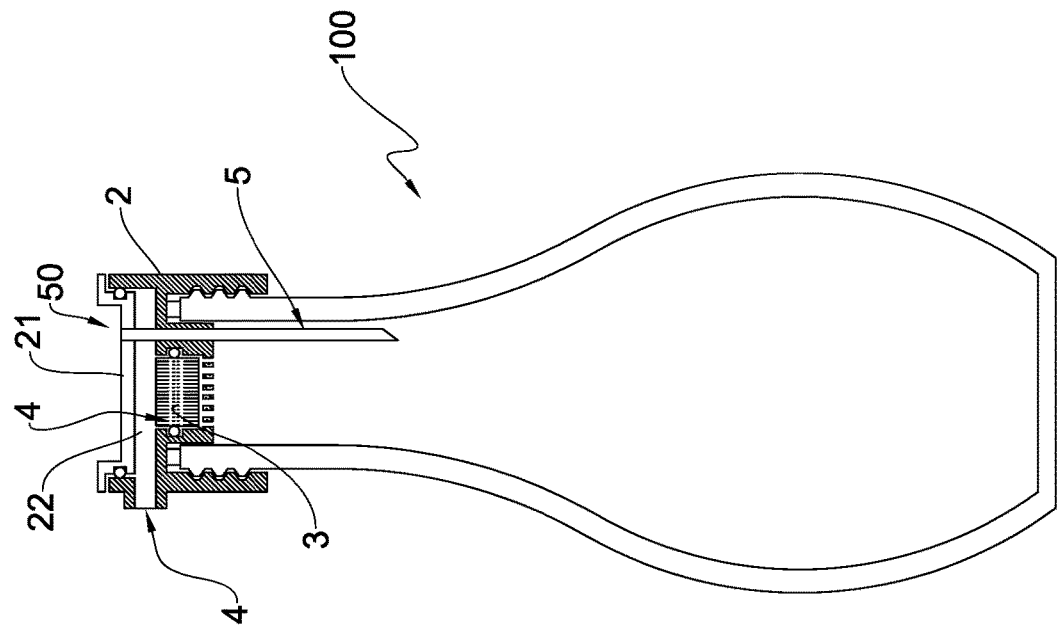
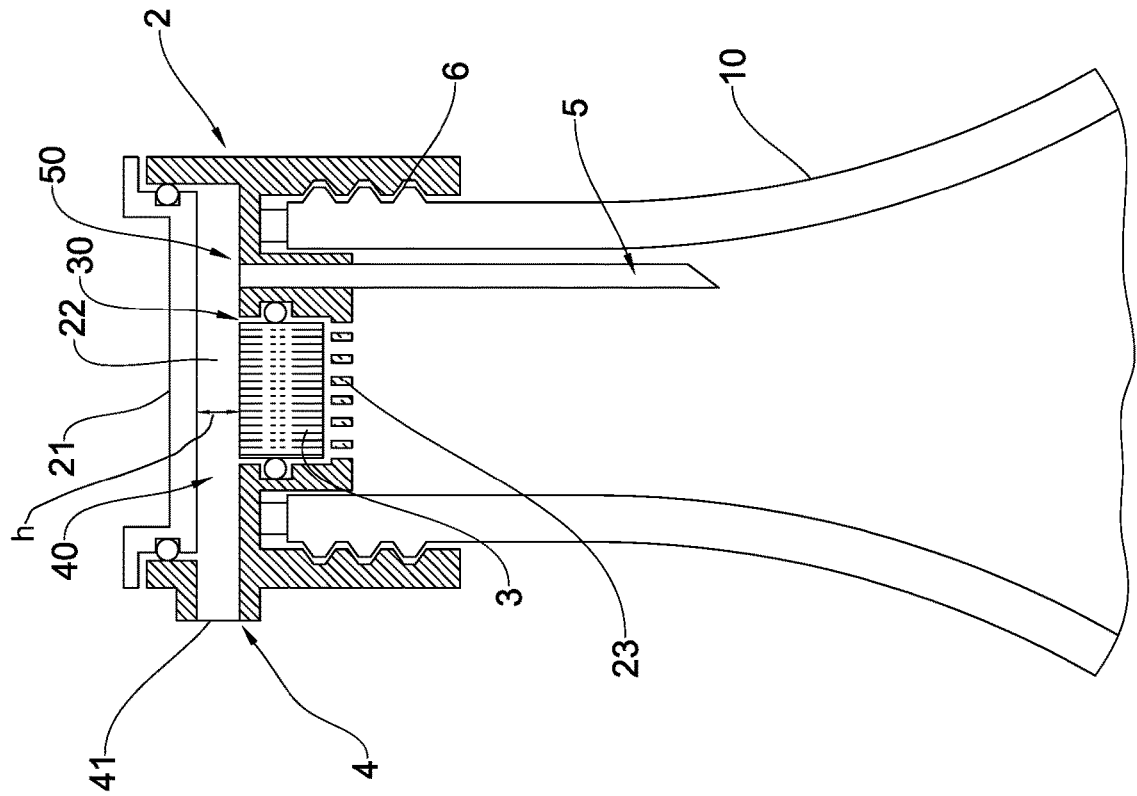

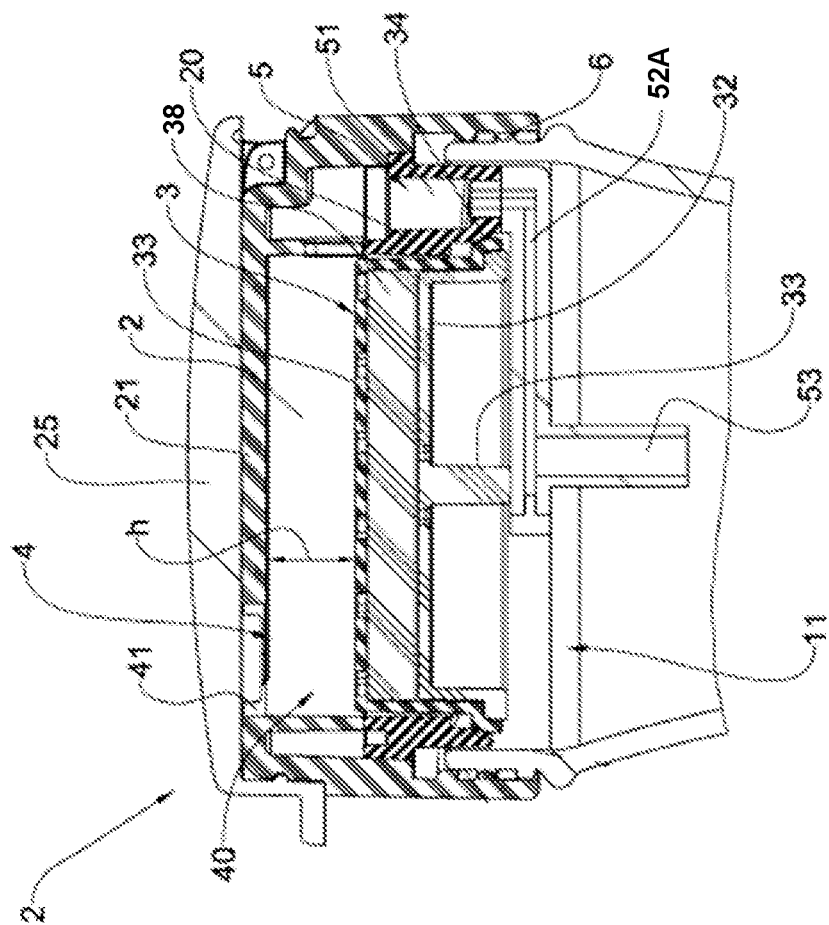
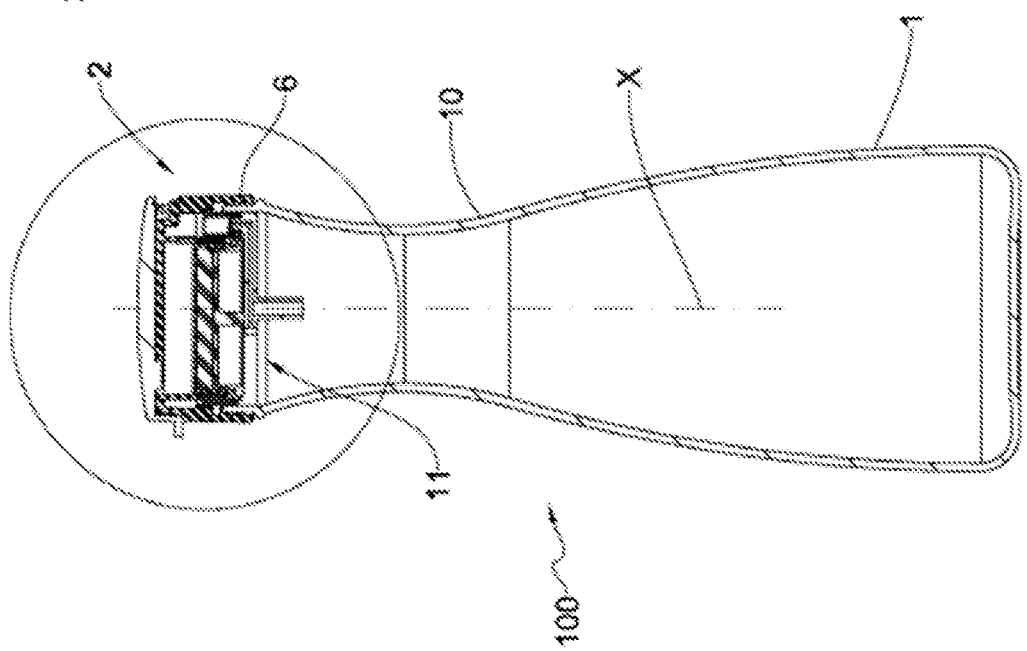

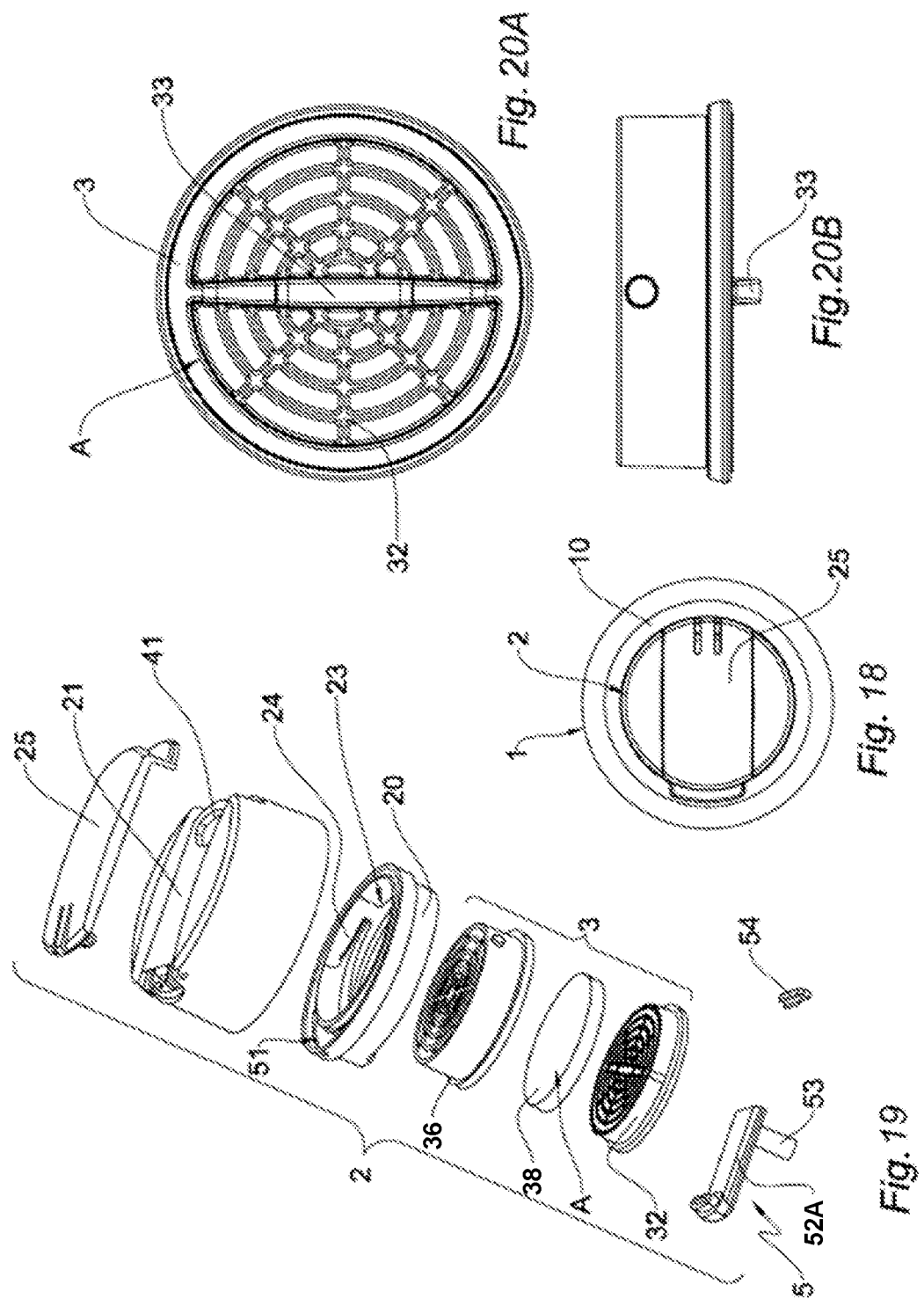

FILTERING CONTAINER FOR LIQUIDS

CROSS REFERENCE TO RELATED APPLICATIONS

This application is a U.S. National Phase filing of International Patent Application No. PCT/M2020/050186 filed on Jan. 10, 2020, which claims the priority of Italian Patent Application No. 102019000010746 filed on Jul. 2, 2019 and Italian Patent Application No. 102019000000487 filed on Jan. 11, 2019. The disclosures of these applications are hereby incorporated by reference in their entirety.

TECHNICAL FIELD

The present invention relates to a filtering container for liquids, in particular water, of the type including a main body and a filtering element which is arranged so as to intercept the water being discharged from an opening formed in the main body.

BACKGROUND OF THE DISCLOSURE

In the context of water treatment, a variety of filtration solutions are widely used, which are suitable for removing undesirable substances therein and/or improving the characteristics and the taste thereof.

Typically, this need is linked with the desire to improve the quality of the water which is supplied by the public water distribution service. To this end, there are used filtering beds, for example, of the type with ion exchange or activated carbon.

One of the main difficulties connected with these filtration systems is linked with the need to provide the water with sufficient hydrostatic thrust so that it passes through the filtering surface which, by nature, represents an obstacle to the passage of the water.

One possible solution can be the so-called percolation-type filtering systems, for example the one described in WO 2010/142473 A1, which uses the action of gravitational force for the passage of the water from an upper tank to a lower tank through a filtering bed. It is evident that this solution, even if effective, requires a given time for filtering the water, because a filtering bed with ion exchange is typically used.

Another solution which is often used in flasks for sporting activities involves the use of a container with deformable walls, in which a filter is arranged in the region of the outlet of the container.

Therefore, by pressing the walls it is possible to force the water through the filter and discharge it from the container substantially instantaneously.

There are also known solutions in which the container is further provided with a unidirectional valve, which allows the admission of air but not the discharge of liquids, so as to allow the walls of the container to return to a non-deformed condition.

An example of such a filtering system is described in the U.S. Pat. No. 6,565,743.

Another solution which is used in flasks involves the use of containers with rigid walls combined with a straw, through which the user can suck the liquid.

Examples of these flasks are described in US 2018/044201, US 2008/203007, WO 2006/031838 and US 2016/031721.

However, it is evident that this solution may be suitable in the context of a flask which is intended to be used in a sporting context, but it is not suitable for other situations, for example for common domestic use.

However, it would be desirable to have filtering systems in which the filtration takes place at a sufficient speed with no need to apply on the liquid any additional pressure except the hydrostatic thrust.

Therefore, the problem addressed by the present invention is to provide a filtering container which is structurally and functionally configured to overcome one or more of the disadvantages mentioned with reference to the cited prior art.

Another object is to provide a filtering container which can ensure filtration of the liquid and a subsequent dispensing which is sufficiently rapid for normal domestic uses and in particular food-related uses.

Another object is to provide a filtering container in which the filtering and dispensing of the liquid can take place without additional forces on the liquid, apart from the hydrostatic thrust.

Another object of the present invention is to provide a filtering container which can be readily used by the user, for example, for the consumption of water at table.

SUMMARY OF THE DISCLOSURE

This problem is solved and these objects are achieved by providing a filtering container which is constructed in accordance with the disclosed subject matter.

In fact, it will be appreciated that the presence of a ventilation pipe which opens inside the main body in a ventilation zone ensures the admission of air inside the container during the dispensing of the liquid, promoting the normal flow of liquid being discharged from the container despite the presence of the filtering element. Furthermore, even if the opening of the ventilation pipe is wetted by the liquid, thanks to the elongate extent of the pipe, in the form of an element which is elongate towards the inner side of the main body of the container, the hydrostatic pressure which acts in the region of the pipe is less than the one acting on the filter. This allows the flow to be improved, allowing simpler admission of air inside the container.

Therefore, the dispensing region is preferably arranged adjacent to a side wall of the main body of the container so that the liquid can be dispensed naturally by a lateral inclination of the container. Preferably, the ventilation zone is arranged in a position opposite the dispensing zone so as to optimize the admission of the air, counter-balancing the pressure of the water or other liquid being dispensed.

In some embodiments, the filtering container is configured in such a way that the discharge of the liquid takes place simply by inclining the main body of the container.

According to an aspect of the invention, the opening of the main body extends in a planar surface, with the dispensing zone and the ventilation zone being arranged in opposite positions to the planar surface itself. Preferably, the dispensing pipe has a cross-section smaller than the dimension of the dispensing zone so that the presence of the dispensing pipe does not prevent contact between the water and the dispensing zone. Preferably, when the container is supported on a planar surface, the opening of the ventilation pipe inside the main body is arranged in a lower position than the filtering element. More generally, the ventilation pipe can open inside the main body in a distal position to the opening.

According to another aspect, the ventilation pipe comprises a tube or pipe which extends inside the main body.

In some embodiments, the ventilation pipe which may be formed by the above-mentioned tube extends inside the main body over a distance equal to ⅟₁₅, preferably ⅟₁₀, of the longitudinal extent of the main body. In preferred embodiments, the main body has a circular section in the region of the opening. Preferably, the dispensing group is connected to the opening by a threaded connection. This simplifies the construction of the container and possibly makes the closure group interchangeable so that it can be adapted to different containers.

According to another aspect of the invention, the filtering element has a flat shape and is preferably received in a removable way in a receptacle defined in the closure group. This feature allows easy replacement of the filtering element after depletion of its filtering capacity.

According to a preferred embodiment, the ventilation pipe extends inside the main body adjacent to a portion of the side wall of the main body near the ventilation zone and opens inside the main body in a distal position to the opening. This prevents or in any case reduces the risk that the liquid in the container can be discharged directly from the ventilation pipe, when the container is inclined in order to pour out its content.

Preferably, the dispenser comprises a dispensing spout which is formed on the closure group. In some embodiments, the spout extends transversely to an axial extent direction of the main body.

According to another aspect of the invention, the closure group comprises a cap for alternately allowing or preventing access to the receptacle of the filtering element.

In a preferred embodiment, between the cap and the filtering element is defined a storage chamber in which the fluid is collected during discharge from the filtering element. The dispensing spout is arranged laterally to the storage chamber. In this way, the flow of fluid during discharge from the container can be carried out more gradually.

According to another aspect, the ventilation pipe has a contraction suited to prevent the passage of water during discharge from the main body through the pipe itself. In this way, the risk is minimized that unfiltered liquid can be poured out passing through the ventilation pipe.

Preferably, the main body is made of rigid material, allowing the container to be easily gripped and to be inclined in order to pour out its content.

On the basis of another aspect of the invention, a ventilation pipe is provided which opens inside the main body in a ventilation zone which is arranged in a different position to the dispensing zone of the liquid to ensure the admission of air inside the container during the dispensing of the liquid, promoting the normal flow of liquid during discharge from the container despite the presence of the filtering element.

In some embodiments, the ventilation zone can be arranged centrally to the surface on which the opening extends, taking into account the peripheral positioning of the dispensing zone.

On the basis of a preferred embodiment, the filtering container is configured in such a way that the liquid is discharged simply by inclining the main body of the container.

According to another aspect of the invention, the opening of the main body is closed by a closure group which, preferably, has an upper wall. Therefore, a storage chamber is defined between the upper wall and the filtering element of the container in which the fluid is collected during discharge from the filtering element.

According to a preferred embodiment, the ventilation pipe opens inside the storage chamber.

Preferably, the storage chamber has a flat shape and a height of at least 0.6 mm.

According to another aspect of the invention, the ratio between the height and the area of the filtering surface which is defined by the filtering element is higher than ⅟₂₀₀.

The applicant has observed that the presence of one or more of these features allows the air to converge through the ventilation pipe without the discharge of the water impeding its regular flow. In particular, the features of the storage chamber allow the simultaneous passage of water and air, thereby allowing a rapid and regular discharge of the liquid.

According to an aspect of the invention, the opening of the main body extends over a planar surface, with the dispensing zone and the ventilation zone being arranged in opposite positions to the planar surface itself.

In preferred embodiments, the main body has a circular cross-section in the region of the opening. Preferably, the dispensing group is connected to the opening by a threaded connection. This simplifies the construction of the container and possibly makes the closure group interchangeable, so that it can be adapted to different containers.

According to another aspect of the invention, the filtering element has a flat shape and is preferably received in a removable way in a receptacle defined in the closure group. This feature allows easy replacement of the filtering element after depletion of its filtering capacity.

It is to be understood that both the foregoing general description and the following detailed description are exemplary, but are not restrictive, of the disclosure.

BRIEF DESCRIPTION OF THE DRAWINGS

The features and advantages of the invention will be better appreciated from the detailed description of a number of embodiments thereof which are illustrated, by way of non-limiting example, with reference to the appended drawings, in which:

FIG. 1 is a cross-section of a filtering container according to the invention;

FIG. 1A is a cross-section which illustrates the container of the present invention when the liquid present therein is poured out;

FIG. 2 is a detailed view of the filtering container of FIG. 1;

FIGS. 3 to 16 are cross-sections of alternative embodiments of the filtering container of the present invention;

FIGS. 17 and 17A are a cross-section and a relevant detail of a filtering container according to another embodiment of the invention;

FIG. 18 is a top view of the container of FIG. 17;

FIG. 19 is a perspective, exploded view of a closure element with a relevant filtering element and ventilation pipe, details of the container of FIG. 17; and FIGS. 20A and 20B are a bottom view and a side view of the filtering element of FIG. 19, respectively.

DETAILED DESCRIPTION OF THE DISCLOSURE

Figure 4:
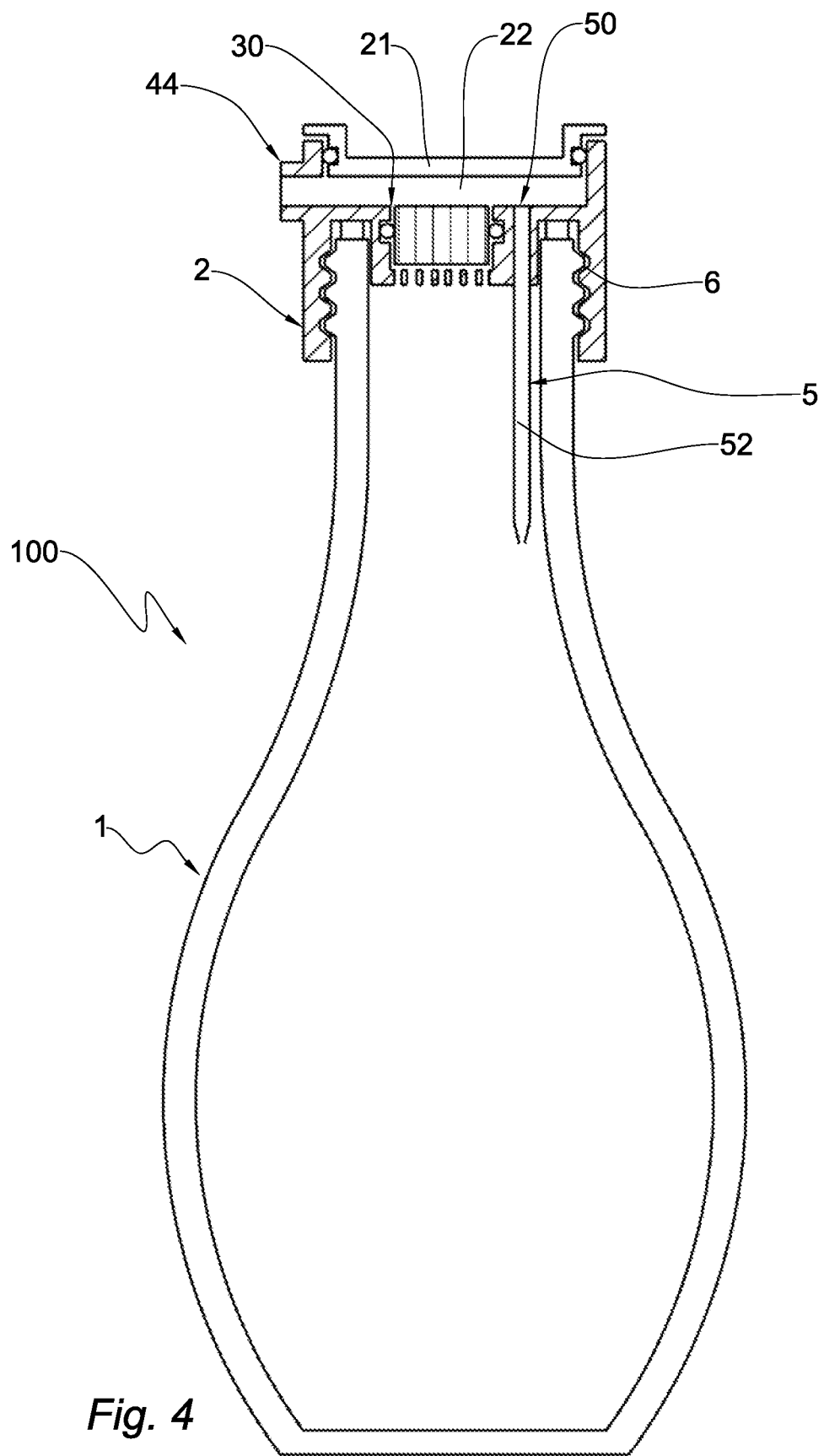
Figure 5:
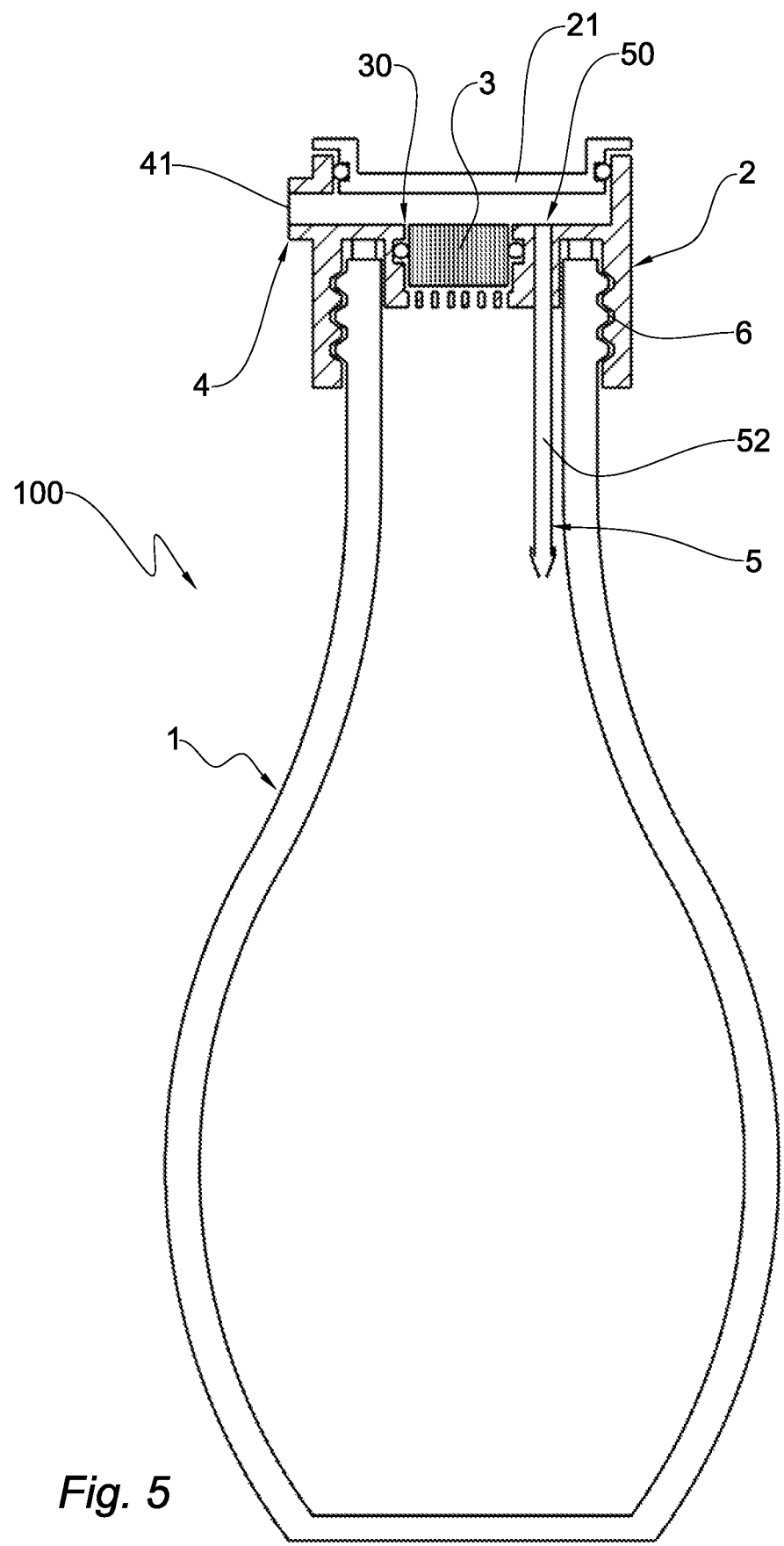

Initially with reference to FIG. 1, a filtering container is generally designated with the number 100.

The container 100 may be formed, for example, in a bottle-like way or a jug-like way and comprises a main body 1 which defines a space which is adapted to contain the liquid to be filtered.

More generally, the container 100 comprises a gripping portion 10, by which the container 100 can be gripped and lifted so as to pour the liquid contained therein. To this end, the main body 1 may advantageously be made of a rigid material, such as, for example, a thermoplastic or glass material.

The gripping portion 10 may be formed by a suitably shaped portion of the main body 1, as in the example illustrated in the Figures, or by a handle or the like.

Preferably, the main body 1 defines a main axis X which may be the longitudinal extent axis or an axis of axial symmetry of the main body 1 itself.

In preferred embodiments, the main body 1 defines an opening 11, for example formed in the region of an upper end of the main body 1 itself. It may be noted that in the context of the present invention the adjective "upper" is intended to be understood as the highest portion of the container 100 when it is supported on a planar surface, parallel with the horizontal, for example a table.

The container 100 further comprises a closure 2 which is arranged so as to close the opening 11 according to methods which will be described below in greater detail.

Advantageously, the closure 2 can be connected to the opening 11 by a threaded connection 6 and, to this end, the main body 1 can be provided with a circular cross-section in the region of the opening 11. Other connection solutions which are illustrated in the alternative embodiments of FIGS. 6, 7, 8, 9, 15 and 16 may include bayonet-type, interlocking-type and snap-fit connections, and the like.

The closure 2, which is better illustrated in a preferred embodiment in FIG. 2, comprises a filtering element 3 which is arranged in such a position as to intercept the liquid being discharged from the main body 1.

As can be seen in FIG. 1A, when the container 100 is inclined the liquid therein wets the closure 2, reaching the filtering element 3 which can be passed through by the liquid, and so filtered.

As an example, the filtering element 3 may be formed by an activated carbon filter, a carbon block-type filter, fabric impregnated with carbon, fabric impregnated with resin, fabric impregnated with resin and carbon, antibacterial fabrics with a magnetic charge, granular or powdered materials, micro-perforated fabrics, membranes. Clearly, the listing provided above is non-exhaustive and the present invention may also be used similarly in the case of other filtering materials.

In some embodiments, the filtering element 3 has a flat shape which is arranged parallel with the discharge cross-section from the opening 11. In this way, it is possible to maximize the contact zone between the liquid and the filtering surface of the filtering element 3 when the container 100 is inclined.

As may be appreciated from the construction variants of FIGS. 6 to 9 and 14 to 16, however, there may also be provided filtering elements 3 of elongate form, for example, with a cylindrical shape.

In some embodiments, the filtering element 3 may be received in a removable way in a receptacle 30 which is defined in the closure 2. This receptacle 30 may be, for example, made by a cavity which can be accessed by removing a suitable upper wall 21 of the closure 2. The upper wall 21 may seal against a lip 44 of the closure 2 (see FIG. 4). Preferably, the filtering element 3 is placed in abutment on a mesh-like surface which defines a base of the receptacle 30. This is particularly advantageous because it allows an additional filtration of the liquid before it reaches the filtering element 3 and suitable support of the filtering element 3 itself.

According to a preferred embodiment, the closure 2 also comprises a dispensing spout 41, through which the liquid is poured when the container 100 is inclined. Preferably, the spout 41 extends transversely to the axis X of the main body 1.

In other words, the spout 41 is arranged laterally to the opening 11 in such a way that the container 100 is configured so that the liquid can be poured following its inclination towards the spout 41, as illustrated, for example, in FIG. 1A.

More generally, there may be present a dispenser 4 which is configured in such a way that the liquid is dispensed through a dispensing zone 40 for the liquid which is defined adjacent to a side wall of the main body 1. It may be noted, for example in the embodiment of FIGS. 1 and 1A, how the dispensing zone 40 is defined near the wall of the main body 1 near the opening 11.

It may be noted that there may be provided alternative solutions for the dispenser 4 or to the spout 41 of the present embodiment. For example, the dispenser may be made by, or more generally comprise, an outlet channel for the fluid from the closure 2 or an outlet opening which is constructed in a different way.

Furthermore, the dispenser may be made by any element which is suitable for forcing or at least promoting the pouring of the liquid via a preferred inclination. For example, the presence of a suitably constructed handle or a grip can, even if the spout 41 is missing, be such that the dispensing zone 40 is unambiguously defined similar to the one described in relation to the present embodiment.

Now with reference again to FIG. 2, in preferred embodiments a storage chamber 22 is also provided between the upper wall 21 and the filtering element 3. The storage chamber 22 is substantially formed by a gap defined between the filtering element 3 and the upper wall 21, when the latter is arranged to close the closure 2.

When the liquid is poured, during which the fluid is collected during discharge by the filtering element 3, the dispensing spout 41 is arranged laterally relative to the storage chamber 22.

Therefore, it will be appreciated that, when the liquid present in the container 100 is poured out, the filtered liquid passes inside the storage chamber 22, on the one hand, while, on the other hand, air passes towards the interior of the container 100.

The applicant has found that, in order to optimize the passage of the liquid and air, the storage chamber 22 may have a flat shape and have a height h which is preferably equal to at least 6 mm, in accordance with what is illustrated in FIG. 2. FIG. 17A also depicts the height h.

Furthermore, also with reference to FIG. 3, in some embodiments the area of the filtering surface of the filtering element 3 has such dimensions that the ratio between the height h and the area A (see FIG. 19) of the filtering surface is greater than $1/200$.

The container 100 of the present invention further comprises a ventilation pipe 5 which opens inside the main body 1 in a ventilation zone 50, which is arranged in a position opposite the dispensing zone 40 for the liquid.

In the embodiment in which the opening 11 has a circular cross-section, the ventilation zone 50 is arranged in a position opposite to the dispensing zone 40, each one in the vicinity of the outer edge of the opening 11.

More generally, in a preferred embodiment, the opening 11 of the main body 1 extends over a planar surface, with the dispensing zone 40 and the ventilation zone 50 arranged in opposite positions to the planar surface defined in this way.

As clearly illustrated in FIG. 1A, the ventilation pipe 5 allows the introduction of air inside the container 100 during the emptying thereof so as to re-balance the pressure therein.

This promotes the discharge speed of the liquid which is capable of more readily overcoming the resistance caused by the filtering element 3 to the passage thereof. The provision of a flat filtering element 3 also allows an increase of the discharge speed of the liquid from the container 100.

In an embodiment, the ventilation pipe 5 extends inside the main body 11 adjacent to the side wall of the main body 1 in the region of the ventilation zone 50. Preferably, the ventilation pipe 5 opens inside the main body 1 in a distal position to the opening 11.

In the region of the end opposite to the ventilation pipe 5, there is an opening which allows the interior of the container 100 to be placed in communication with the exterior without passing through the filtering element 3.

Preferably, the dispensing pipe 5 has a smaller cross-section than the dimension of the dispensing zone 40 or of the filtering element zone which is wetted when the liquid is poured out in such a way that the presence of the dispensing pipe 5 does not prevent contact between the water and the dispensing zone 40.

It will further be appreciated that, as may be observed in the Figures, when the container 100 is supported on a planar surface, the opening of the ventilation pipe 5 inside the main body 1 is preferably arranged in a lower position than the filtering element 3. More generally, the ventilation pipe 5 may open inside the main body 1 in a distal position to the opening 11.

According to another aspect, the ventilation pipe 5 comprises a tube 52 or a pipe which extends inside the main body 1. The tube 52 is preferably formed by an element which is fixed to a lower wall of the closure 2.

In some embodiments, the tube 52 or more generally the ventilation pipe 5 may extend inside the main body 1 over a distance d of $\frac{1}{15}$, preferably $\frac{1}{10}$, of the longitudinal extent 1 of the main body 1.

Additional embodiments of the ventilation pipe 5 are illustrated in FIGS. 3 to 16.

In the embodiment of FIG. 3, the ventilation pipe 5 extends through the upper wall 21 so as to place the interior of the container 100 directly in communication with the exterior. In other words, the end of the ventilation pipe 5 opposite the end which opens inside the container 100 opens above the upper wall 21.

In this situation, in accordance with the shape of the container 100, it may be easier for the ventilation pipe 5 to come into contact with the liquid and, in order to prevent the discharge of liquid from the container 100 without it passing through the filtering element 3, there may be a non-return valve. It may be noted that the non-return valve may also be used in different embodiments, for example the one in FIG. 1.

Figure 6:
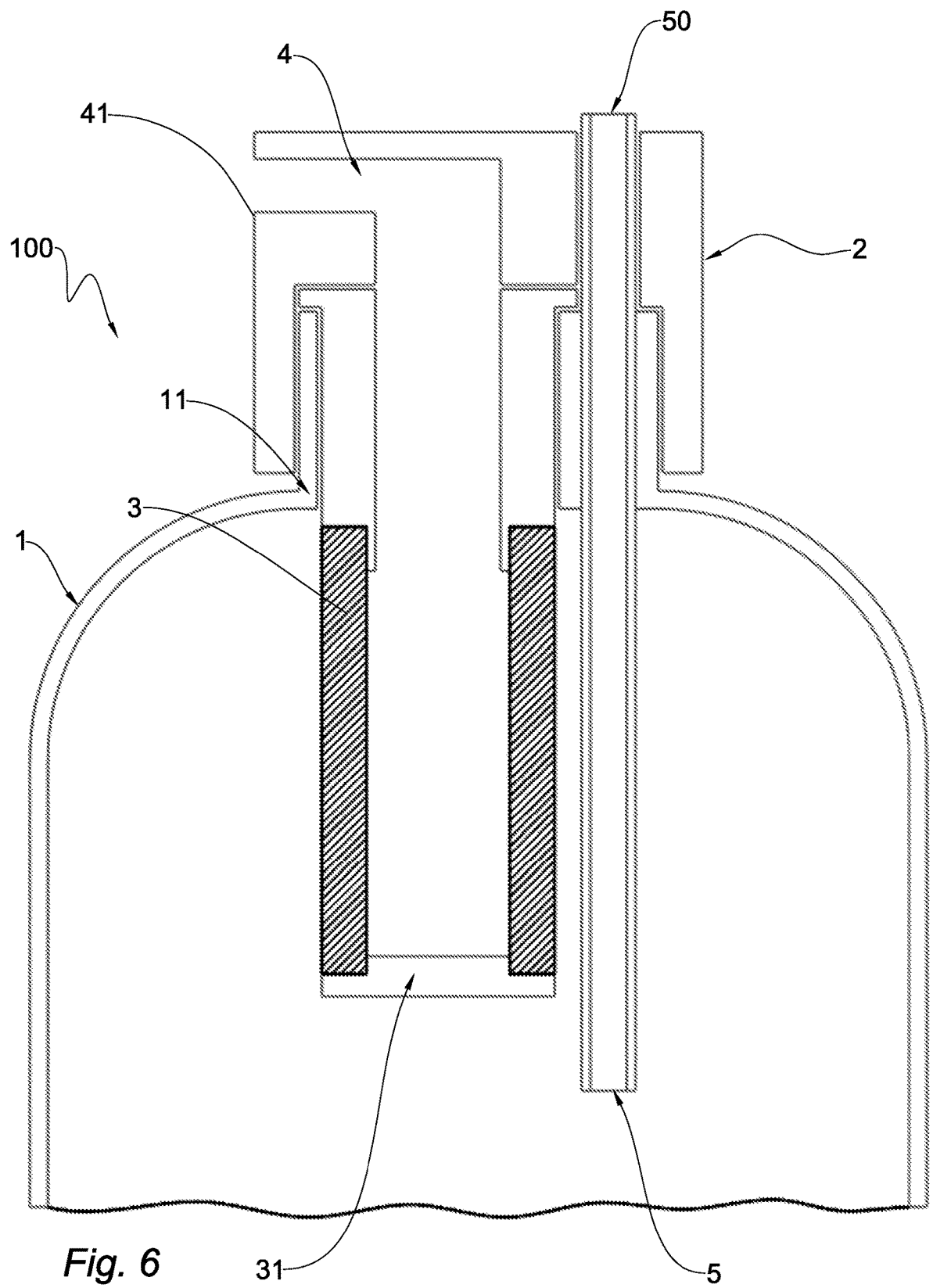

In some embodiments, such as the one illustrated in FIG. 6, the ventilation pipe 5 may be directly arranged in the region of the main body 1 of the container 100.

Preferably, the filtering element 3 extends inside the main body 1, below the opening 11.

In some embodiments, in which the main body 1 has a neck-like portion, the filtering element 3 can be fixed to a support 31 so that the filtering element 3 extends during use below the neck-like portion.

Figure 7:
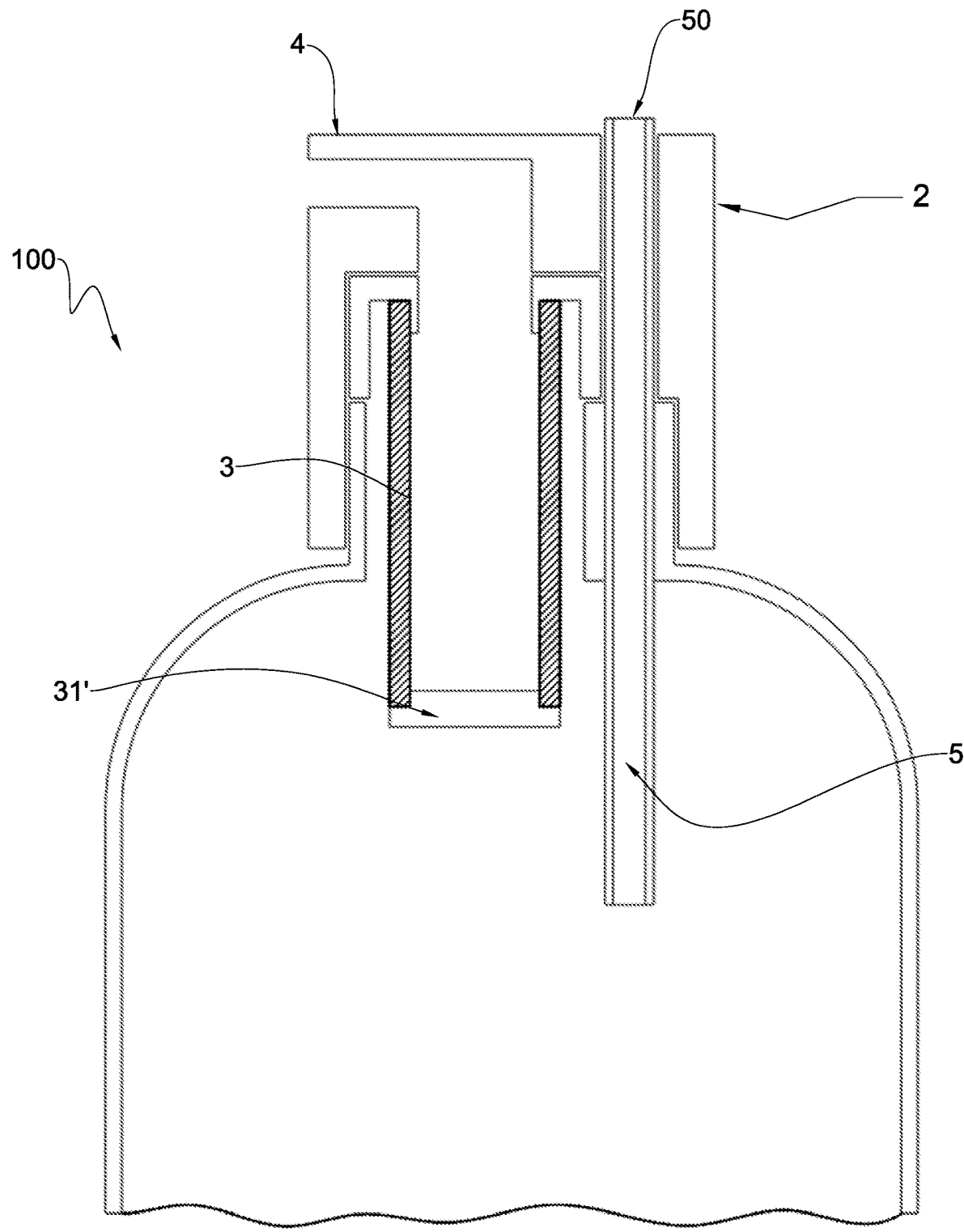

In the embodiment illustrated in FIG. 7, the filtering element 3 that is used is similar to the one in FIG. 6 but there is a support 31' so that the filtering element 3 is supported and configured so as to be partially received in the neck-like portion and partially under the neck-like portion.

Figure 8:
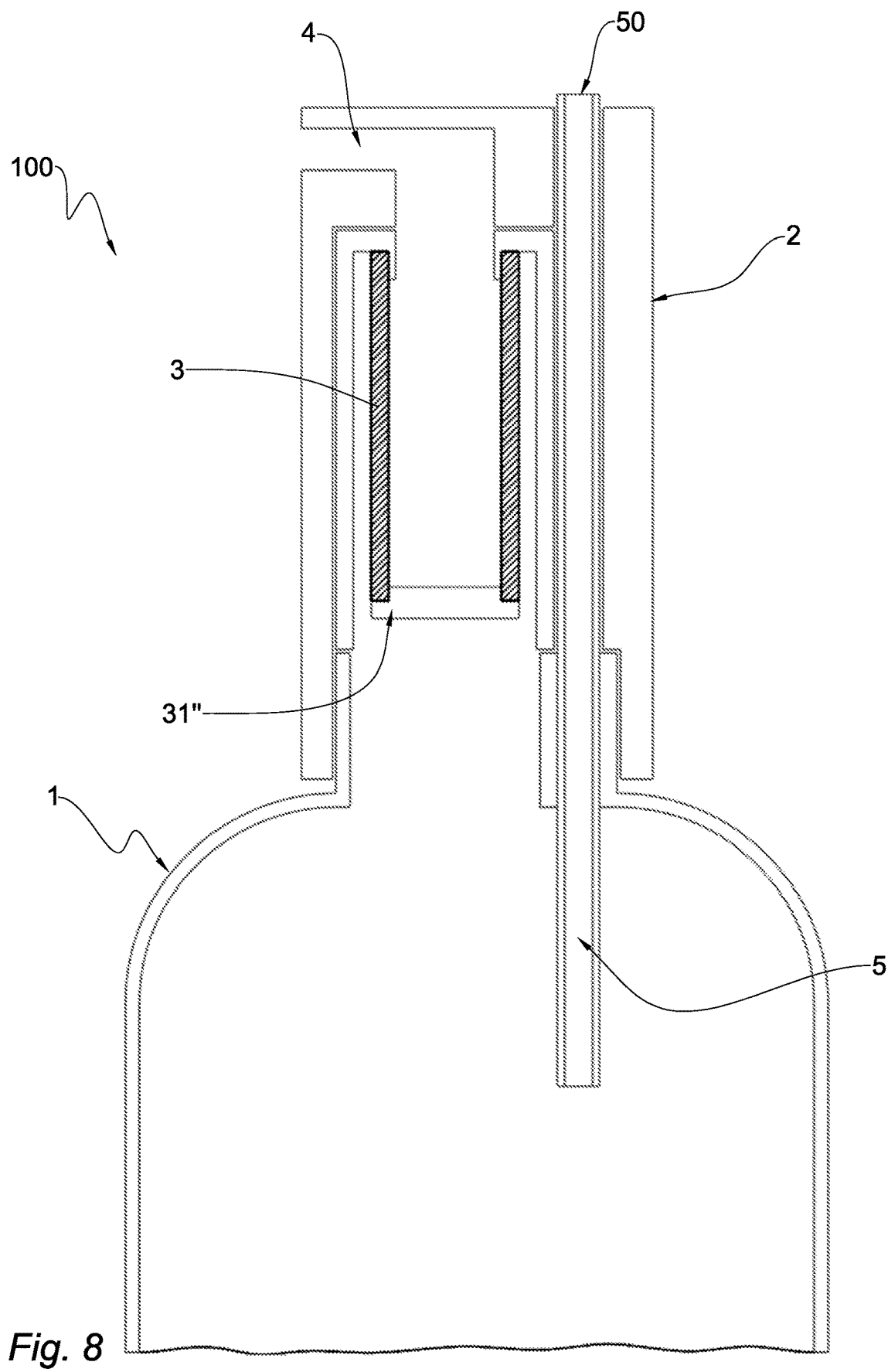

In the embodiment illustrated in FIG. 8, a support 31" is used, by which the filtering element 3 is entirely received inside the neck-like portion.

Figure 9:
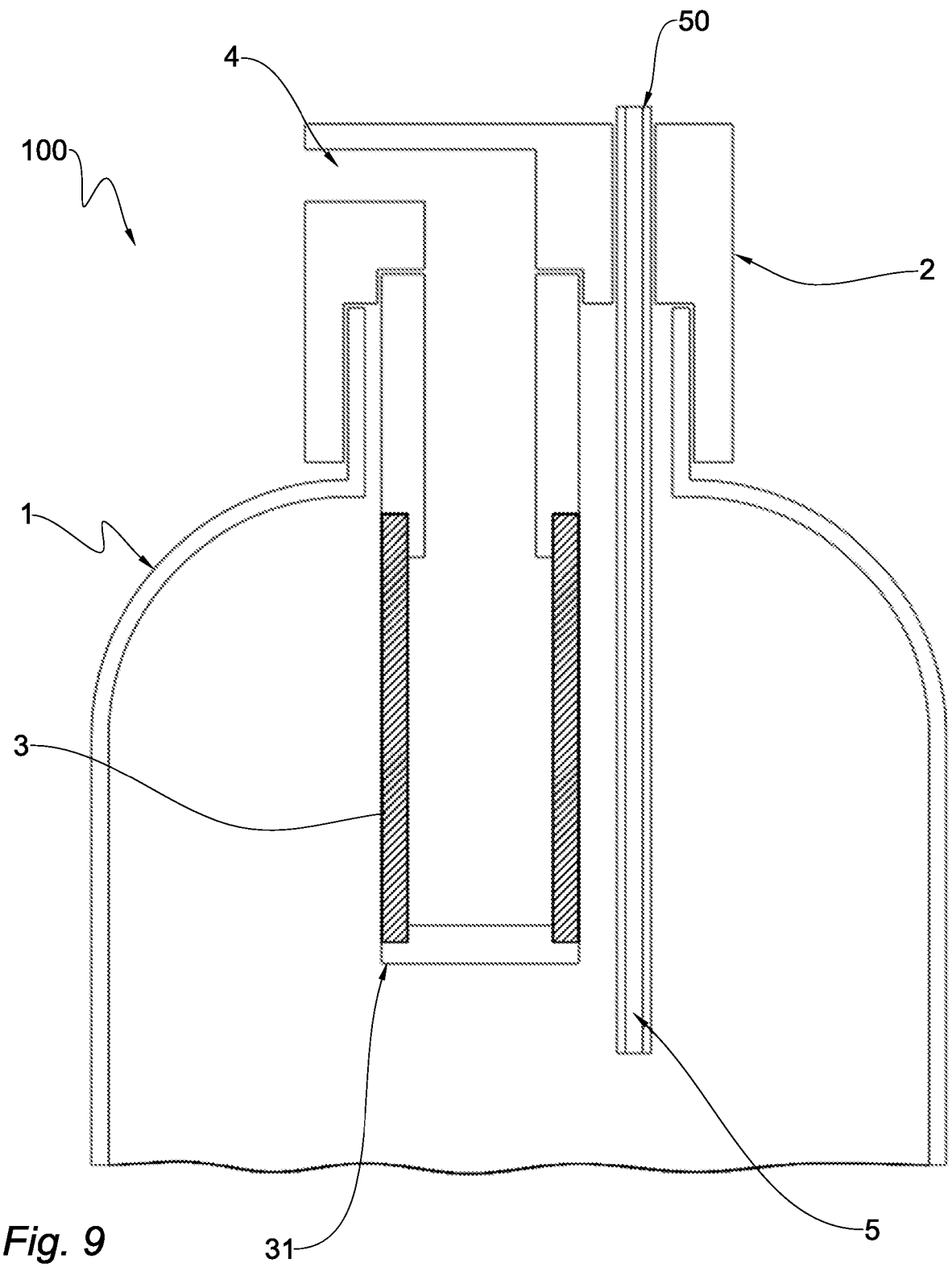

In the embodiment illustrated in FIG. 9, the filtering element 3 that is used is similar to the one described in relation to FIG. 6, but with the ventilation pipe 5 fixed to the closure 2.

On the basis of another construction variation, the ventilation pipe 5 may also extend inside the filtering element 3, as illustrated in the examples of FIGS. 10 to 16.

Figure 10:
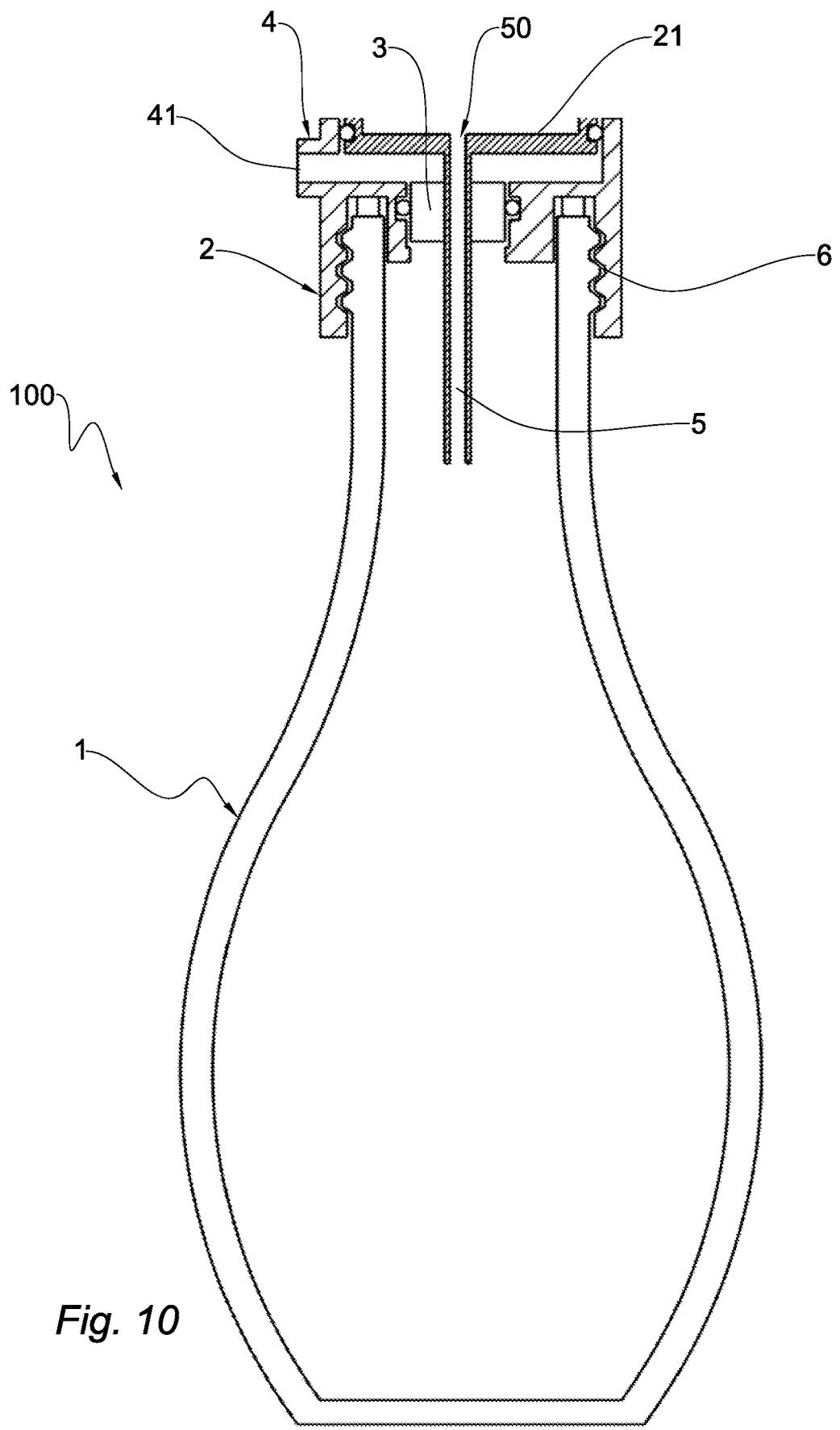

In some embodiments, such as the one illustrated in FIG. 10, the tube 52 is an integral part of the upper wall 21 and the ventilation pipe 5 extends through the upper wall 21.

Figure 11:
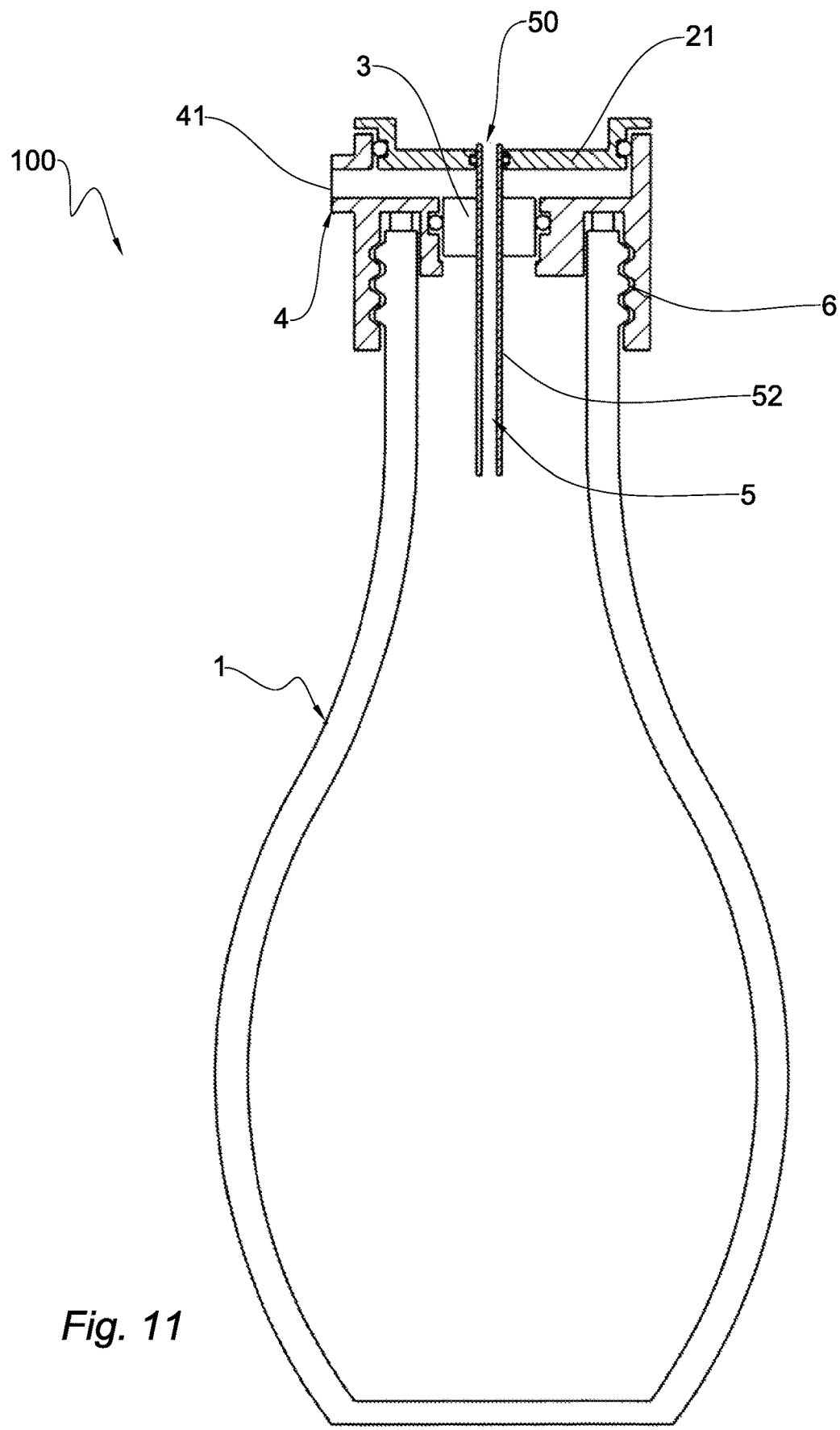

In the embodiment illustrated in FIG. 11, the ventilation pipe 5 that is used is similar to the one of FIG. 10 but where the tube 52 and the upper wall 21 are instead two mutually different components.

Figure 12:
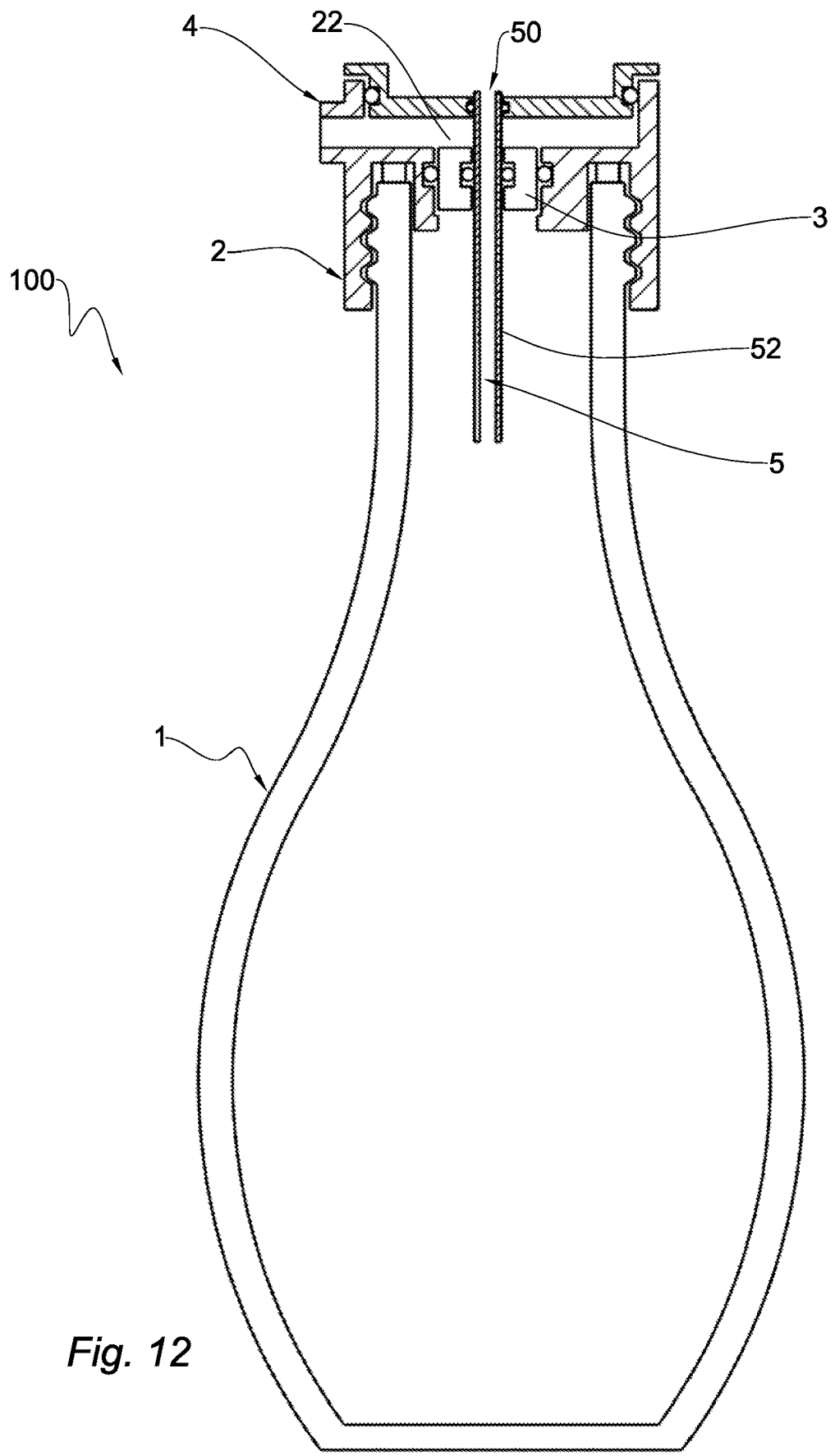

In the embodiment illustrated in FIG. 12, the ventilation pipe 5 and the tube 52 are similar to those of FIG. 11, but where the tube 52 and the filtering element 3 may be instead two mutually different components.

Figure 13:
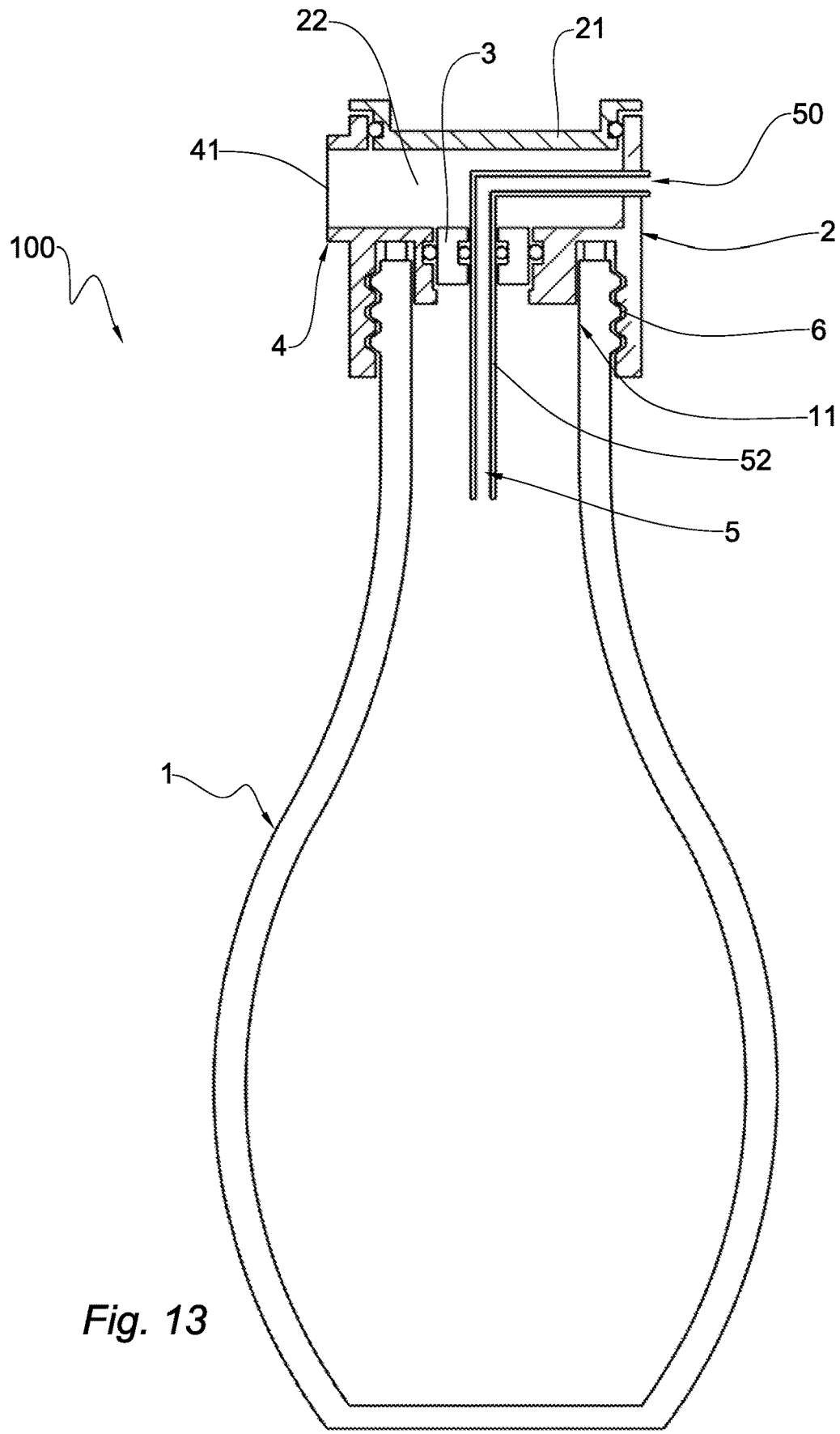

In the embodiment illustrated in FIG. 13, the ventilation pipe 5 and the tube 52 are similar to those of FIG. 12, but, when the ventilation pipe 5 extends through the storage chamber 22, the ventilation pipe 5 can make a 90° deviation in the opposite direction to the position of the spout 41. Consequently, in this embodiment, the ventilation zone 50 is arranged laterally to the opening 11.

Figure 14:
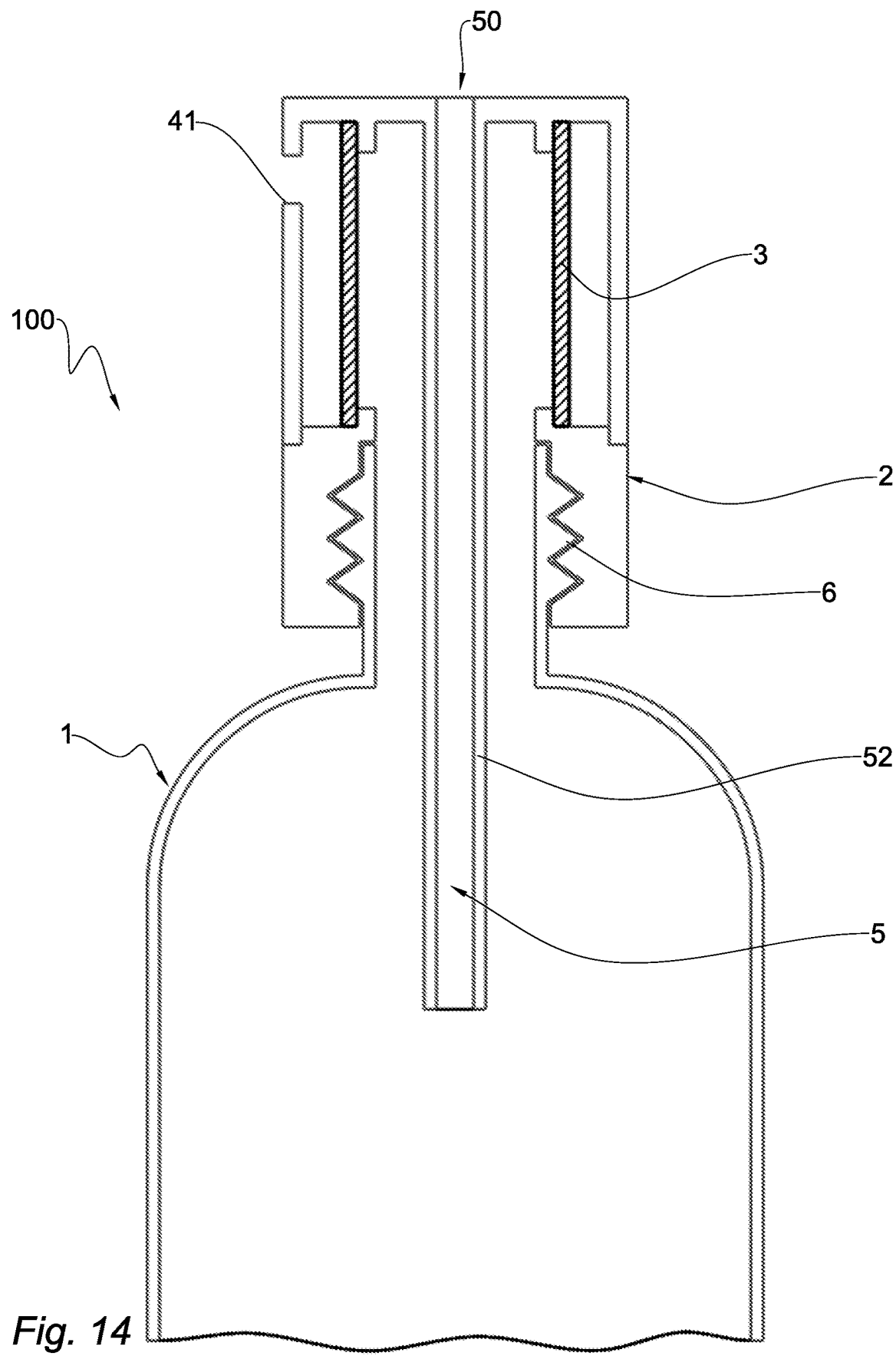

In the embodiment illustrated in FIG. 14, the filtering element 3 is entirely received inside the closure 2. The closure 2 comprises a lower portion and an upper portion which can be separated in a way suitable for allowing the replacement of the filtering element 3. In this embodiment, the dispensing zone 40 is arranged in the upper portion of the closure 2.

Figure 15:
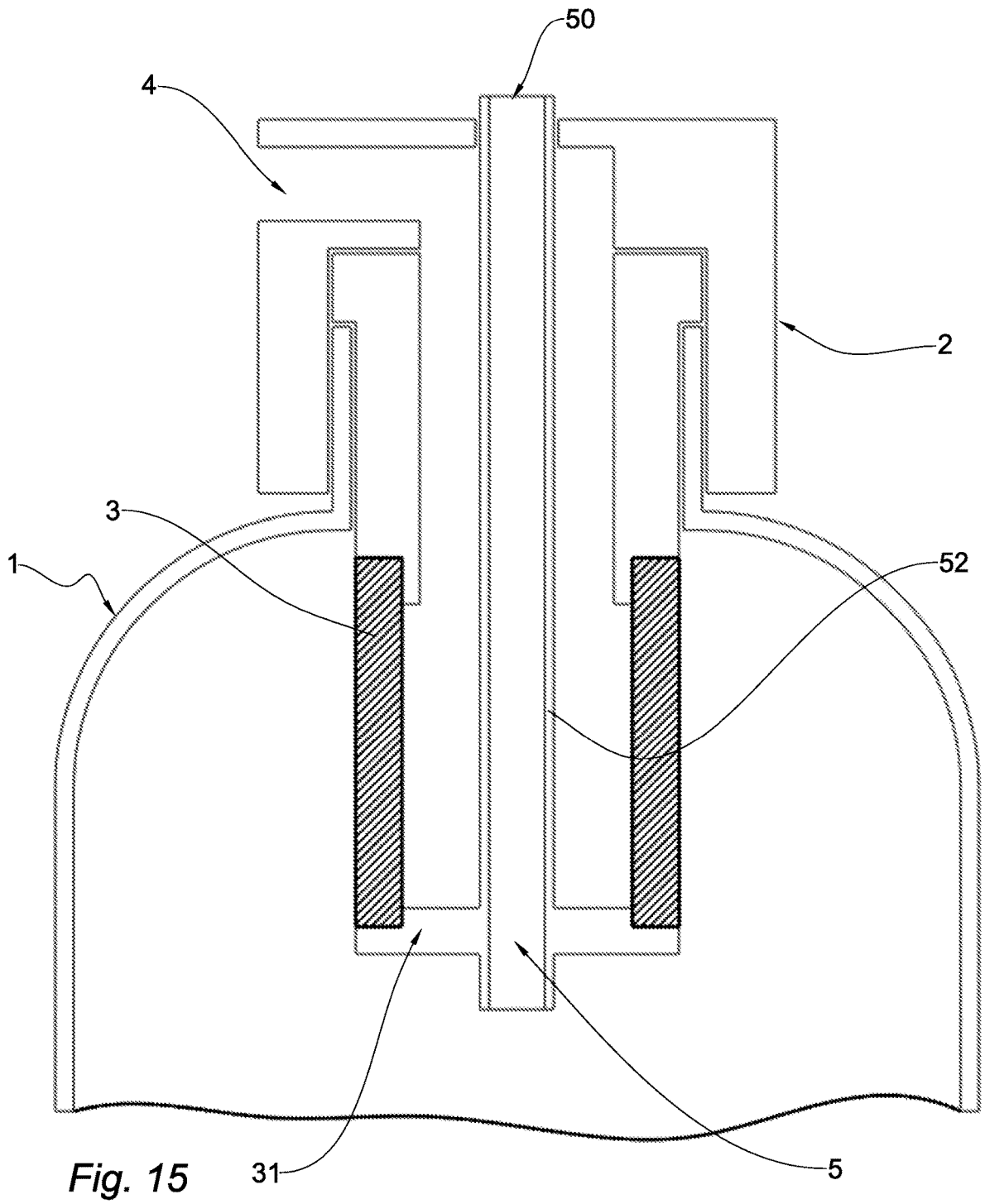

In the embodiment illustrated in FIG. 15, the filtering element 3 is fixed to the support 31, through which the ventilation pipe 5 extends, and the tube 52 is an integral part of the support 31.

Figure 16:
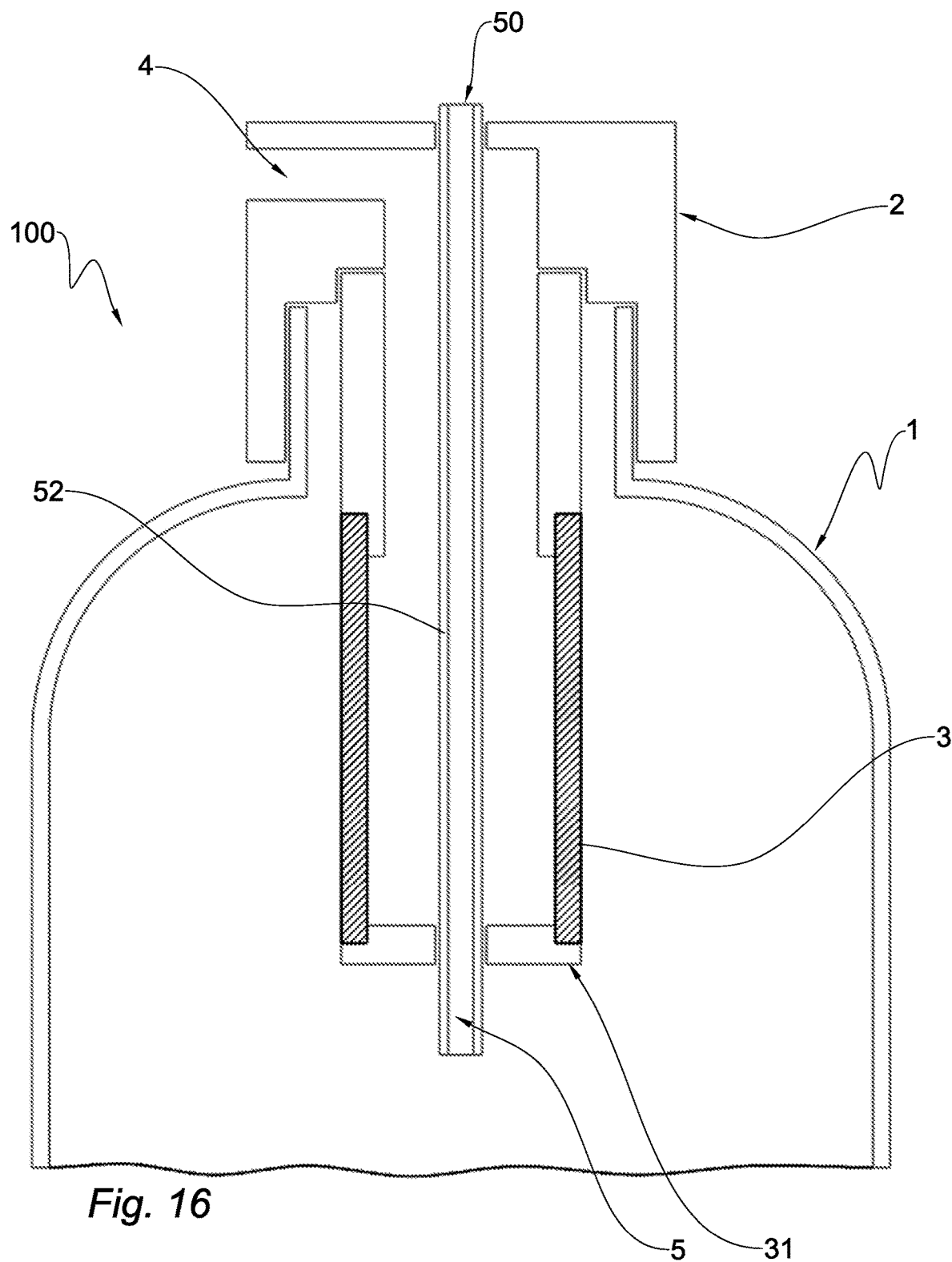

In the embodiment illustrated in FIG. 16, there is instead provided a tube 52 which is different from the support 31, but which is connected thereto.

Now with reference to FIG. 17, there is illustrated an additional embodiment of the filtering container 100 of the present invention.

In this case, the gripping portion 10 can also be formed where applicable as a suitably shaped portion of the main body 1, as in the example illustrated in the Figures, or as a handle or the like.

Preferably, there is defined in the main body 1 the main axis X which can be the longitudinal extent axis or an axis of axial symmetry of the main body 1 itself.

In this case, the container 100 also further comprises the closure 2 which is arranged so as to close the opening 11 in accordance with methods which will be set out in greater detail below.

Advantageously, the closure 2 can be connected to the opening 11 by the threaded connection 6 and, to this end, the main body 1 can be provided with a circular cross-section in the region of the opening 11.

The closure 2, which is better illustrated in a preferred embodiment in FIG. 17A, comprises the filtering element 3 which is arranged in a position so as to intercept the liquid during discharge from the main body 1.

As can be observed in FIG. 17A, when the container 100 is inclined the liquid present therein wets the closure 2, reaching the filtering element 3 which can be passed through by the liquid, and is thereby filtered.

By way of example, the filtering element 3 may also in this case be formed by an activated carbon filter which is formed by intertwined fibers of carbon or by other types of filtering material which are suitable for the purpose. Now also with reference to FIGS. 19, 20A and 20B, according to preferred embodiments, the filtering element 3 has a flat shape, which is arranged parallel to the discharge section from the opening 11. In this way, it is possible to maximize the contact zone between the liquid and the filtering surface of the filtering element 3 when the container 100 is inclined.

According to preferred embodiments, the filtering element 3 is formed by a replaceable cartridge and comprises a casing 36, wherein a filtering member 38 is received, the filtering member 38 being formed where applicable by the above-mentioned carbon fibers. In some embodiments, the casing 36 of the filtering element 3 is associated with a cover 32.

Preferably, the casing 36 and/or the cover 32 has/have a mesh-like structure which allows the passage of the water inside the filter so that it can reach the filtering surface of the filtering element 3.

In some embodiments, the filtering element 3 is received in a removable way in a receptacle 23 which is defined in the closure 2. In this case, in order to simplify the handling of the filtering element 3, there may be present a gripping portion 33 which can be reached, for example, by removing the closure 2 from the main body 1.

Advantageously, the receptacle 23 may have a shoulder, in abutment to a relevant edge 34 of the filtering element 3. There may also be a connection 24 between the receptacle 23 and the filtering element 3, for example, formed by a bayonet-type connection, as in the example of FIG. 3.

Again with reference to FIGS. 17A and 18, according to preferred embodiments, the closure 2 also comprises the dispensing spout 41, through which the liquid is poured when the container 100 is inclined.

Again with reference now to FIG. 18, in preferred embodiments there is provision for the storage chamber 22 between the upper wall 21 of the closure 2 and the filtering element 3. The storage chamber 22 is substantially formed by a gap which is defined between the filtering element 3 and the upper wall 21.

In some embodiments, the upper wall 21 is defined by a removable cap 25 when it is arranged so as to close the closure 2.

It will be appreciated that the cap 25 can also be used to close the dispensing spout 41, as illustrated in the embodiment of FIG. 17A.

It may further be noted that the storage chamber 22 is configured in such a way that the dispensing spout 41 extends in a peripheral zone of the storage chamber 22 itself.

In other words, when the liquid is poured, during which the fluid is collected during discharge by the filtering element 3, the dispensing spout 41 is arranged laterally to the storage chamber 22.

The container 100 of the present embodiment comprises the ventilation pipe 5 which opens inside the main body 1 in the ventilation zone 50 which is arranged in a position opposite to the dispensing zone 40 for the liquid.

Therefore, it will be appreciated that when the liquid present in the container 100 is poured out, inside the storage chamber 22, on one hand, the filtered liquid passes through during discharge while, on the other hand, air passes towards the interior of the container 100.

The applicant has found that, in order to optimize the passage of the liquid and air, the storage chamber 22 may have a flat shape and a height h which is preferably equal to at least 6 mm, in accordance with what is illustrated in FIG. 17A.

Furthermore, also with reference to FIG. 3, in some embodiments the area of the filtering surface of the filtering element 3 has such dimensions that the ratio between the height h and the area A of the filtering surface is greater than $1/200$.

Still with reference to FIGS. 17A and 19, the ventilation pipe 5 extends preferably over a first portion 51 thereof through a main structure 20 of the closure 2, in a position adjacent to the receptacle 23.

In some embodiments, the ventilation pipe 5 has, preferably during discharge from the first portion 51 towards the interior of the main body 1, a contraction 52A suitable for impeding the passage of water being discharged from the main body 1 through the pipe 5 itself.

Where applicable, the ventilation pipe 5 may again widen in the direction away from the opening 11 at an end portion 53. The tube 52 is preferably associated with the end portion 53, where applicable with features similar to those of the preceding embodiments. A plug 54 may be provided to close the tube 52, if desired.

According to a preferred embodiment, the contraction 52A extends from a peripheral portion of the closure 2 towards a central portion of the opening 11. In this case, the contraction 52A may advantageously be removably connected to the main structure 20 so as to allow access to the opening 11. Furthermore, the contraction 52A may abut the gripping portion 33 of the filtering element 3 so as to improve the robustness and the assembly simplicity of the structure of the closure 2.

In alternative embodiments, at least a portion of the ventilation pipe 5, preferably the one which defines the end portion 53 and the contraction 52A are rotatably supported on the main structure 20 of the closure 2, being connected to the first portion 51 of the ventilation pipe 5.

In this way, this portion of the ventilation pipe 5 can be arranged in two operating positions.

In the first position, the ventilation pipe 5 is arranged so as to be supported on the gripping portion 33 of the filtering element 3 and the contraction 52A is in communication with the first portion 51.

Preferably, the ventilation pipe 5 comprises a resilient portion which engages in a snap-fitting way with the casing 36 or another portion of the closure 2 so as to keep the ventilation pipe 5 blocked in the first operating position.

In the second position, the ventilation pipe 5, or more generally its portion comprising the end portion 53 and the contraction 52A, is arranged in a distal position to the gripping portion 33, therefore allowing it to be gripped and carrying out the replacement of the filtering member 38, or more generally the filtering element 3 in its entirety.

It is also known that in some embodiments the end portion 53 of the ventilation pipe 5 can end in a mesh-like structure which prevents the admission of particles and impurities of various types which could obstruct the ventilation pipe 5.

In other embodiments, the ventilation pipe 5 extends inside the main body 1 adjacent to the side wall of the main body 1 near the ventilation zone 50. Preferably, the end portion 53 may extend over the inner side of the main body 1 as far as a distal position to the opening 11.

In other embodiments, the ventilation pipe 5 extends through the cap 25 so as to place the interior of the container 100 directly in communication with the exterior. In other words, the end of the ventilation pipe 5 opposite to the one which opens inside the container 100 opens above the cap 25.

In another construction variation, the ventilation pipe 5 may extend only through the closure 2 in the region of the main structure 20 without extending under the opening 11.

In this situation, in accordance with the shape of the container 100, it may be easier for the ventilation pipe 5 to come into contact with the liquid and, in order to prevent the discharge of liquid from the container 100 without it passing through the filtering element 3, there may be a non-return valve or other similar element. It is known that the non-return valve may also be used in different embodiments, for example, the one in FIG. 1.

It will be appreciated that a filtering container 100 constructed in this way allows a filtration of water to be obtained in a sufficiently rapid and immediate way. This allows the use of the container 100 as a normal bottle for common food-related uses, allowing filtered water to be poured into glasses without any need for preliminary preparations, except for filling the jug.

In addition, the filtering element 3 used for the present container 100 is simple and easily replaceable by the user after its aging or deterioration.

Although illustrated and described above with reference to certain specific embodiments and examples, the present disclosure is nevertheless not intended to be limited to the details shown.

Rather, various modifications may be made in the details within the scope and range of equivalents of the claims and without departing from the spirit of the disclosure.

The invention claimed is:

1. A filtering container for liquids, in particular water, comprising:
   a main body-having a side wall and defining an interior and an opening;
   a gripping portion which is configured to be gripped by a user for lifting the container and pouring out the liquid contained therein;
   a closure for the opening which includes a filtering element-and a dispenser for the liquid which is configured in such a way that the liquid is dispensed through a dispensing zone for the liquid which is defined adjacent to the side wall of the main body; and wherein the closure defines a receptacle and the filtering element is received in a removable way in the receptacle and further comprises a main structure in the region of the receptacle, the ventilation pipe extending through the main structure of the closure in a position adjacent to the receptacle
   a ventilation pipe which opens at one end inside the main body in a ventilation zone and extends in the form of an elongate element towards the interior of the main body, the ventilation pipe opening inside the main body in a distal position with respect to the opening,
   wherein the filtering element is arranged in a position to intercept the liquid being discharged from the main body by being located proximate the opening and the dispensing zone which is defined adjacent to the side wall of the main body so that the liquid in the container wets and passes through the filtering element only when the container is inclined and during discharge of the liquid from the main body, the liquid being unable to discharge from the main body without passing through the filtering element,
   and wherein a further opening is defined in the ventilation pipe in a region of an end of the ventilation pipe opposite to one which opens inside the main body, the further opening allowing the interior of the container to be placed in communication with the exterior without passing through the filtering element.

2. The filtering container according to claim 1, wherein the ventilation pipe comprises a tube which extends inside the main body.

3. The filtering container according to claim 1, wherein the main body has a longitudinal extent and the ventilation pipe extends inside the main body over a distance which is equal to $1/15$ of the longitudinal extent of the main body.

4. The filtering container according to claim 1, wherein the ventilation zone is external to the dispensing zone for the liquid.

5. The filtering container according to claim 1, wherein the opening of the main body extends in a planar surface, the dispensing zone and the ventilation zone being arranged in opposite positions with respect to the planar surface.

6. The filtering container according to claim 1, wherein the closure comprises an upper wall for alternately allowing or preventing access to the receptacle of the filtering element.

7. The filtering container according to claim 1, wherein the dispenser comprises a dispensing spout which is formed on the closure, the spout being arranged laterally to the opening in such a way that the filtering container is configured so that the liquid can be poured following an inclination of the filtering container towards the spout.

8. The filtering container according to claim 7, wherein the closure comprises an upper wall and wherein between the upper wall and the filtering element a storage chamber is defined in the closure in which storage chamber the fluid is collected during discharge from the filtering element, the dispensing spout being arranged laterally relative to the storage chamber.

9. The filtering container according to claim 8, wherein the ventilation pipe opens inside the storage chamber.

10. The filtering container according to claim 8, wherein the storage chamber has a flat shape and a height of at least 6 mm.

11. The filtering container according to claim 10, wherein the filtering element defines a filtering surface which has an area and is configured to be wetted by the liquid during passage through the filtering element, the ratio between the height of the storage chamber and the area of the filtering surface being greater than $1/200$.

12. The filtering container according to claim 1, wherein the ventilation pipe extends inside the main body adjacent to a portion of the side wall of the main body near the ventilation zone.

13. The filtering container according to claim 7, wherein the main body has an axial extent direction and the dispensing spout extends transversely with respect to the axial extent direction of the main body.

14. The filtering container according to claim 1, wherein the main body is made of rigid material.

15. The filtering container according to claim 1, wherein the ventilation zone is arranged in a position opposite the dispensing zone.

16. The filtering container according to claim 1, wherein the opening of the main body extends in a planar surface, the dispensing zone being arranged in a peripheral zone of the planar surface and the ventilation zone being arranged centrally in the planar surface or in a peripheral position opposite with respect to the dispensing zone.

17. The filtering container according to claim 1, wherein the filtering element has a flat shape.

18. The filtering container according to claim 17, wherein the opening defines a discharge cross-section and wherein the filtering element is arranged parallel with the discharge cross-section of the opening.

19. The filtering container according to claim 1, wherein the further opening of the ventilation pipe is arranged in a lower position than the filtering element.

* * * * *